J. V. MEIGS.
Machine for Making and Loading Cartridges.

No. 163,024. Patented May 11, 1875.

6 Sheets--Sheet 2.
J. V. MEIGS.
Machine for Making and Loading Cartridges.
No. 163,024. Patented May 11, 1875.
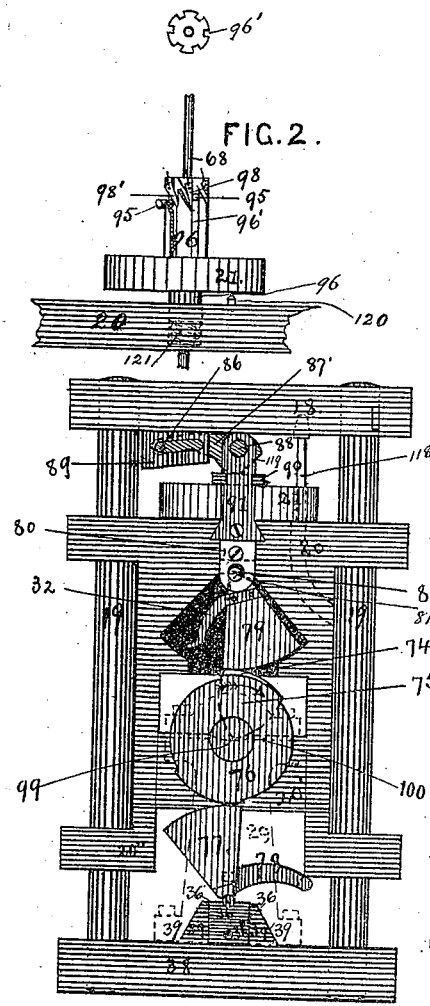
FIG. 2.
FIG. 4.
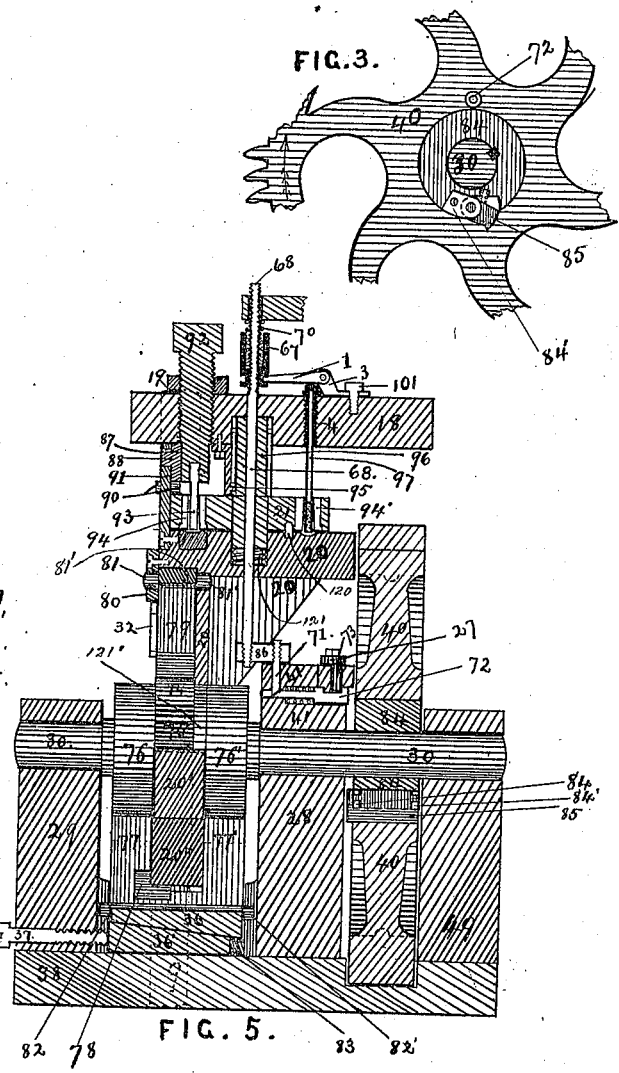
FIG. 3.
FIG. 5.
WITNESSES
INVENTOR
By
Attorney J. V. MEIGS.
Machine for Making and Loading Cartridges.
No. 163,024. Patented May 11, 1875.

WITNESSES
INVENTOR
By
Attorney

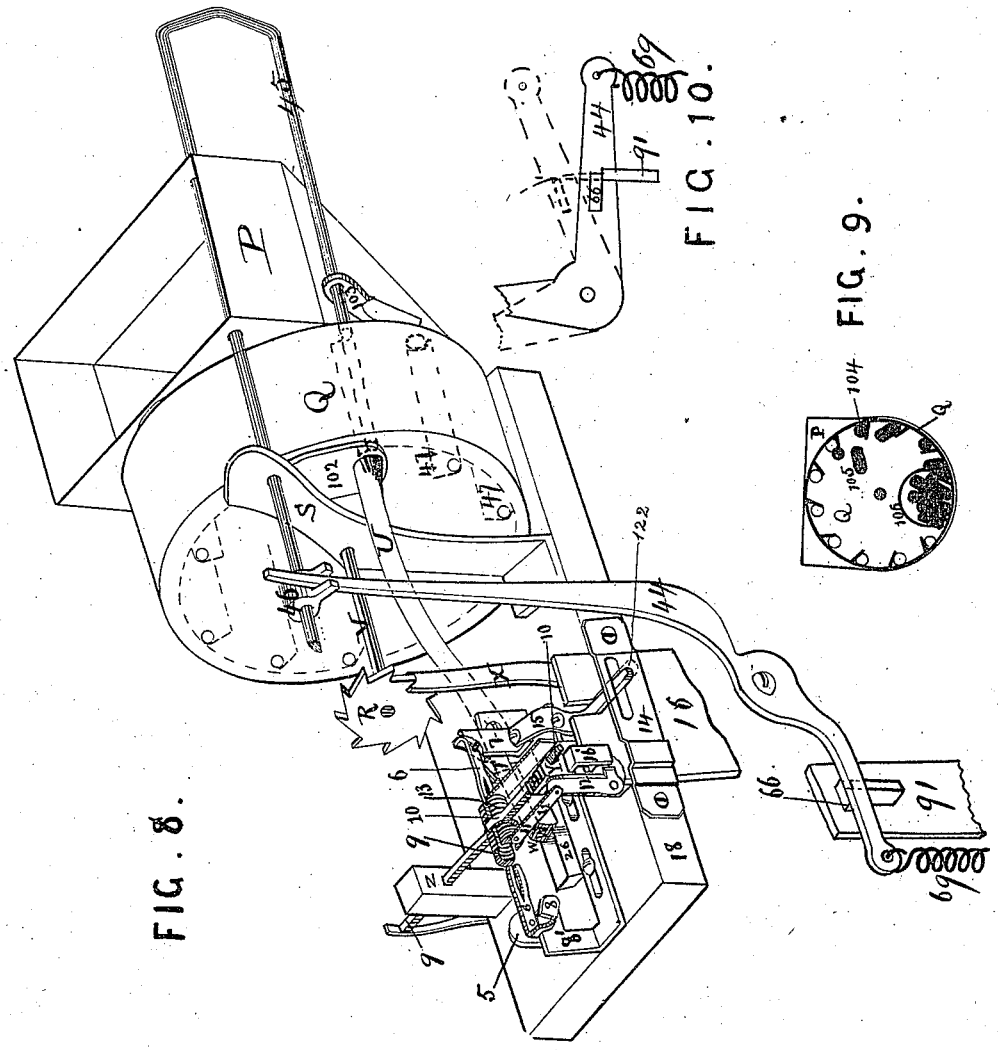

J. V. MEIGS.
Machine for Making and Loading Cartridges.
No. 163,024. Patented May 11, 1875.

6 Sheets--Sheet 6.
J. V. MEIGS.
Machine for Making and Loading Cartridges.
No. 163,024. Patented May 11, 1875.
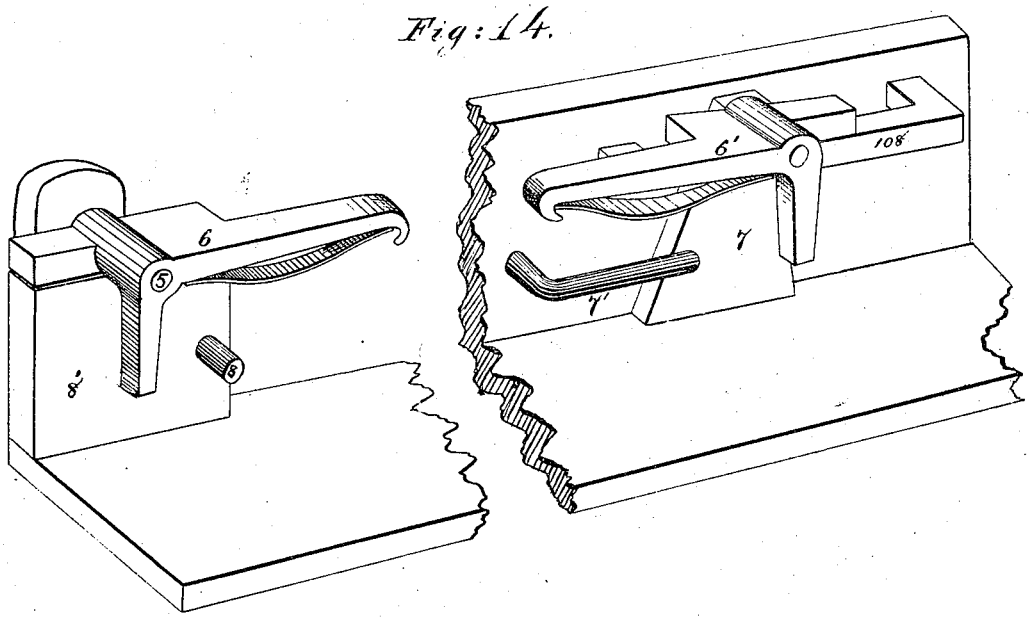
Fig: 14.
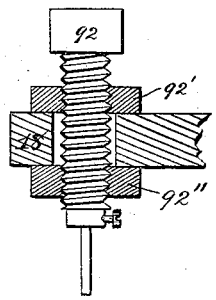
Fig: 16.
WITNESSES
H. H. Young
Baltis De Long
INVENTOR
Jos. V. Meigs
By his Attorney
Wm. D. Baldwin

UNITED STATES PATENT OFFICE.

JOE V. MEIGS, OF LOWELL, MASSACHUSETTS.

IMPROVEMENT IN MACHINES FOR MAKING AND LOADING CARTRIDGES.

Specification forming part of Letters Patent No. 163,024, dated May 11, 1875; application filed December 8, 1874.

*To all whom it may concern:*

Be it known that I, JOE V. MEIGS, of Lowell, in the county of Middlesex and State of Massachusetts, have invented certain new and useful Improvements in Machines for Making Cartridges, of which the following is a specification:

My invention relates to machinery for making cartridge-cases from pieces of metal, for heading cartridge-cups or partially-completed cases, and for priming and filling the cases by a continued connected operation.

The improvements claimed will hereinafter be set forth.

In the accompanying drawings my improvements are shown as embodied in one machine, although some of them might obviously be used without the others.

Figure 1 is a view, in perspective, of the machine; Fig. 2, a view, in elevation, of the die-plate revolving mechanism; Fig. 3, a side view of a part of the clutch mechanism for engaging and disengaging the driving-gearing; Fig. 4, an elevation, showing the construction of the press and the mechanism for locking the die-plate to the platen or resisting-die; Fig. 5, a sectional elevation of the machine through its center; Fig. 6, a view, in perspective, of that part of the machine which weighs the powder with its supports omitted; Fig. 7, a view, in perspective, of that part of the machine which relates to priming a cartridge; Fig. 8, a view, in perspective, of the apparatus for feeding a blank case, piece of metal, or bullet; Fig. 9, a section through the feed-drum, showing the hopper in outline and its opening into the drum; Fig. 10, a view showing a part of the push-rod lever and device for moving it. Fig. 11 is a view, in section, of a part of the shell or blank feeding and assorting devices; Fig. 12, an enlarged view of that part of the blank-feeding device which transfers the blank from the feed-trough to the distributing-fingers; Fig. 13, a sectional view of the end of similar distributing-fingers applied to feeding bullets; Fig. 14, views, in perspective, of the distributing-fingers shown in Fig. 12 on an enlarged scale, showing the guides for controlling their movements; Fig. 15, a view, in perspective, of the priming-applying devices in a position the opposite of that shown in Fig. 7 as applying the fulminate to a shell; Fig. 16, a sectional view, showing the method of securing the punch-holder in place, so as to be adjusted both longitudinally and laterally.

A bed-plate, 38, supports guide-rods 19 19. A carriage, 20, slides upon these rods on boxes 20″ moving freely up and down. (See Figs. 1 and 4.) Posts 29, 28, and 49 arise from the bed-plate, and support a crank-shaft, 30, provided with hubs 76 76′, between which is a segmental eccentric crank-shaft, 74 75, passing through an opening in the carriage, Figs. 4 and 5. The hubs 76 76′ during the revolution of the shaft operate upon sectors 77 77′, Figs. 4 and 5. The eccentric part 74 of the segmental crank operates upon a sector, 79, which is pivoted to the carriage at 81. The crank-shaft is revolved by a gear, 40, Figs. 1, 3, and 5, in this instance shown as loose on a hub, 84, keyed to the shaft, as in Fig. 3, which shows a clutch, 85, pivoted at 84′ to the hub. The shaft might be enlarged or formed in one piece with the hub. A stop-pin, 72, in the cap 41 of the post 28 is encircled by a spring, which tends always to keep the pin projected when it is released from a catch or detent, 71, Fig. 5. When, as the hub 84 revolves, being carried through its clutch 85 by means of the gear, so as to bring the clutch against the roller (which has been freed from its detent) on the end of the pin 72, the clutch is forced into its recess in the hub, thus disconnecting the hub and wheel. The pin may be retracted by means of a lever, 27, acting through a pin, 73, to start the machine. A die-plate, 21, is mounted upon an axle on the top of the carriage or platen, so as to rotate in a horizontal plane with its lower face parallel with the carriage or platen.

The die-plate is locked to the platen of the press, which forms a resisting-die on the upward movement of the carriage, by means of a cam, 87′, Fig. 4, pivoted at 88, in a pivot-stand, 91, secured to the carriage, the cam acting upon a friction-plate, 90, resting upon the die-plate 21. An oscillating movement is imparted to the cam by means of a pin, 86, in the end of a lever projecting from the cam engaging with a slotted plate, 89, fastened to the top 18 of the press, so that, when the press-carriage descends, the cam 87' is oscillated so as to bring its face 119 downward, freeing the die-plate from its resisting-die formed in or by the carriage-top or platen. A dowel-pin, 120, on the top of the carriage 20, catching in suitable holes in the bottom of the die-plate, insures the stoppage of the die-plate opposite the proper points. The die-plate is freed from this pin by a spring, 121, acting upon it to press it upward, as shown in Figs. 2 and 5, thus allowing it to be revolved. The die-plate may be lifted by a pin, 107, in the top 20 of the press, coming in contact with some fixed surface on the bed-plate as the carriage descends. (See Fig. 11.) The die-plate may be partially revolved upon its hub, at suitable intervals, as shown in Fig. 2, by means of a sleeve or hub, 96, connected with the die-plate, and surrounding a rod, 68, (through which the driving-clutch is disconnected,) passing through the resisting-die or platen, around which rod the sleeve is turned by means of a pin, 95, running in grooves 96', which have in them a series of deflecting-pawls, 98 and 98'. This pin 95 is stationary, and the movement of the carriage up and down causes it to traverse the slots so as to produce the revolution of the die-plate. A feed-plate, 22, Figs. 1 and 11, revolving upon a stud, 112, upon the top of the carriage 20, overlaps the die-plate 21, and has perforations 35, which register, one at a time, with the dies in the die-plate. This plate may be revolved by means of teeth on its periphery meshing at 109 with similar teeth of a gear, 21', attached to the die-plate. The die-plate thus revolves the feed-plate with it, and brings in succession the openings in the feed-plate over the dies in the die-plate. A tube, 26, for receiving a blank or shell, is fixed in the top plate 18 of the press, and by means of a sliding or telescopic section, 25, supported by a sleeve, 23, sliding on the guide-rod 19, follows the movement of the carriage up and down, thus keeping the bottom of the tube always at the same distance from the feed-plate, to which it conveys the blanks or shells.

The blanks are fed into the flaring end or funnel of the tube 26, as follows: A carrier, 9 13, brings the blanks over the tube to assorting tilting-fingers 6 6', one 6' of which moves forward into or against the shell in the carrier 9 13, Figs. 11 and 12, pushing the shell onto 6, if the shell should be in the reverse position to that shown in Fig. 11, where the shell is shown in its position previous to the entrance of the finger 6'. The finger 6' is pivoted at 5' to a sliding post, 7, and the finger 6 is pivoted at 5 to a stationary post, shown in dotted lines. The post 8' is mounted upon a plate, as shown in Figs. 11 and 14. The top of the piece 8' slides in contact with the bottom of the back flange of the finger 6, and prevents the finger from tilting until it (8') has passed the pivot 5. The finger 6' is prevented from tilting until its pivot has reached the end of a stationary guard-piece, 108, as its flange slides on the guard-piece. The pivots of the fingers, as their flanges slide on the piece 8' and guard 108, respectively, reach the ends of the piece, and guard at the moment of contact between stops 7' and 8, and the arms on the fingers. When the reciprocating post 7 is moved by the sliding of its supporting-plate in the direction of the shell 116, and its finger 6' enters the shell, (the shell being retained in place upon the finger by the friction of a spring, 114',) the downwardly-projecting arm of the finger is brought in contact with the stationary pin or stop 7', and is tilted. That part of the spring 114' not covered by the shell comes in contact with the funnel of the tube 26, and is compressed by it, permitting the shell to drop off when its butt has properly been presented to the tube. The finger 6 is provided with a corresponding spring for the same purpose. At the time of tilting, the stop 8 (shown in dotted lines) secured to the piece 8', projecting from the plate, strikes against the downwardly-projecting arm of the finger 6, tilting it likewise, to drop the blank whether it has been entered by the finger 6 or 6', the carrier springing or yielding to allow the escape of the blank from it.

The reverse movement of the plate carrying the finger 6' and stop 8 now takes place, returning the fingers to their normal positions by the pieces 8' and 108, and they are ready for a repetition of the operation.

The carrying plate may be reciprocated by any suitable well-known means (one way of doing it will hereinafter be described) at proper intervals to feed the blanks to the tube at the desired rate of speed. The fingers are prevented from tilting by the guards 8' and 108 until operated upon by the stops.

Figure 1:
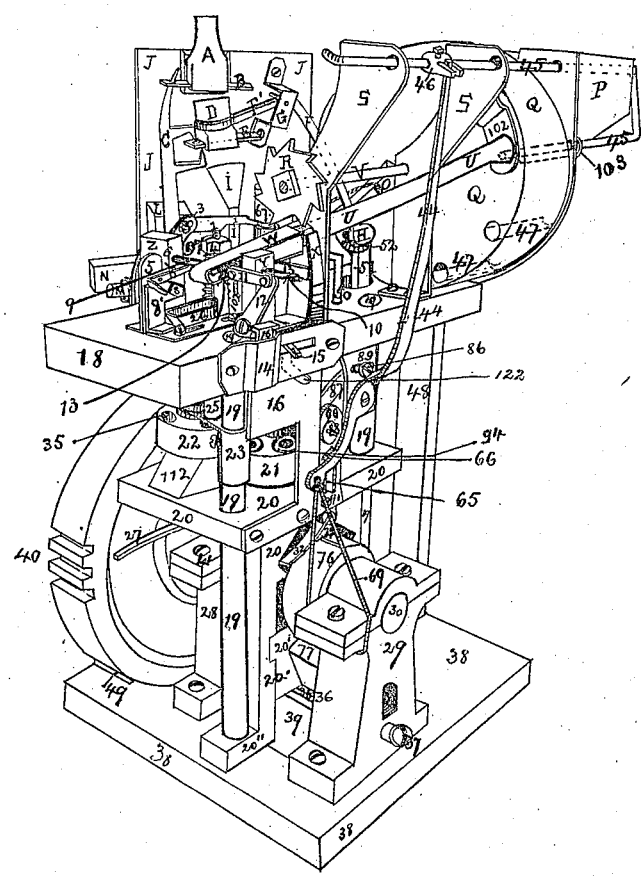

By the yielding of the levers 113 113 the small end of the bullet or blank may enter either finger, according to its position, (being pushed in by the opposite finger,) as the movable finger approaches the other, this yielding being provided for by springs, as shown. The butt end of the bullet rests against the end of one of the fingers and its lever, and is always downward when the fingers tilt to drop it.

When that portion 13 of the carrier attached to the lever 12 is withdrawn by the lever and connecting-rod 11, it passes through a blank-guide, W. The other portion 9 of the carrier follows up the part 13 as far as the guide W, by means of the spring 110, acting on its guide-rod 9', moving in a support, Z. As the twisted guide-rod 10 of the portion 13 of the carrier passes through its support Y it turns the carrier at an inclination corresponding with that of the blank-guide W. The guide-rod 9' also turns in its support Z by means of the twist of its rod 9'. The heads 9 and 13 of the carrier are kept from approaching each other too closely by means of a pin on one of them bearing against the other. A guard-piece, 13', attached to the carrier-head 13, passing through the guide-channel W, prevents the blanks or shells in the tube U from descending too far when the carrier is projected to the fingers, thus acting as a cut-off. When the carrier-head 13 is withdrawn to enter the guide W, a blank or shell passes from the guide in between the heads of the carrier, which turn to a horizontal position for the action of the tilting fingers, before described.

Figure 12:
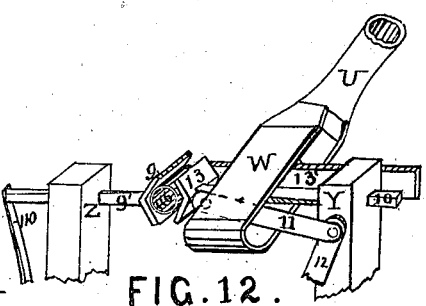
Fig. 12 shows a spring, 110, bearing against the end of the rod, supporting one part, 9', of the carrier, so as to allow it to yield, to release the blank as the fingers tilt.

The tube U, Fig. 12, is shown in Fig. 8 as presented to the face of a drum, Q, opposite one of a series of troughs, 47, therein, which come in line with the tube in succession as the drum revolves. These troughs or shelves are arranged on the inner periphery of the drum. As the drum Q revolves, (by means of a ratchet, R, and spring-pawl, X, actuated as will hereinafter be described,) with its open end against the side of a hopper, P, Figs. 8 and 9, in which the blanks or shells have been placed, they fall into the lower portion of the drum through an opening, 106, in the hopper. The continuous intermittent revolution of the drum picks up such shells or blanks as are caught on its troughs or shelves as they revolve. The shelves are made to project from the drum a distance sufficient to hold the blanks or shells which may be caught thereby so as to rest lengthwise thereon, such shells or blanks as are caught so as to rest on one end falling off. Such of the blanks or shells properly caught which are not pushed to the tube U by a push-rod, 45, also fall off when carried around toward the top of the drum. This push-rod is guided by guides 103, S S, and in the hopper, and is reciprocated by means of a rock-lever, 44, pivoted to a suitable support, and operated, as will hereinafter be described, by means of the spring 69 and a reciprocating rib, 91, acting on a lip, 66, on the lever.

The blank having been fed to the die-plate 21, the first partial revolution of the die-plate presents the blank in the die to the action of a suitable inspector to stop the press, if necessary, similar to a powder-inspector, hereinafter to be described. The next partial revolution of the die-plate presents the blank in the die to the action of a fixed punch secured in a holder, 92, to head the shell. This punch is secured in the stationary head 18 of the press.

I prefer to secure the punch-holder to the head, as shown in Fig. 16, in which the punch-holder is shown as passed loosely through an opening in the press-head, and secured by nuts 92' 92" on the threaded holder. By this method of securing the punch it may be held firmly, while admitting of both longitudinal and lateral adjustment.

Figure 7:
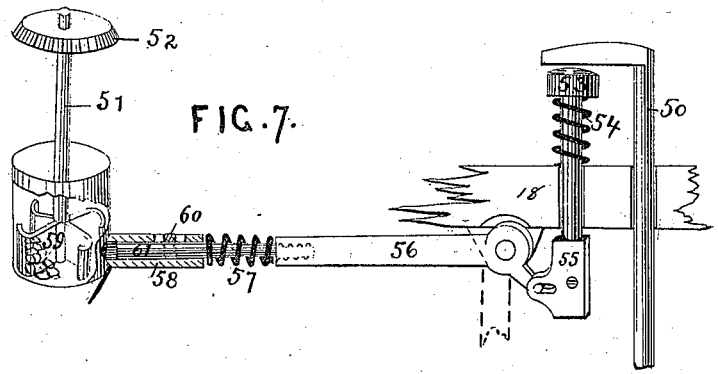

The next partial revolution brings the headed shell in the die-plate to another inspector, from which, by the revolution of the die-plate, the shell is presented to a primer, Fig. 7, in this instance adapted to apply the priming to an inside-prime shell.

Figure 15:
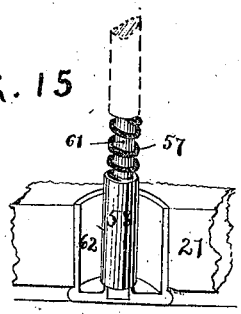
Figure 11:
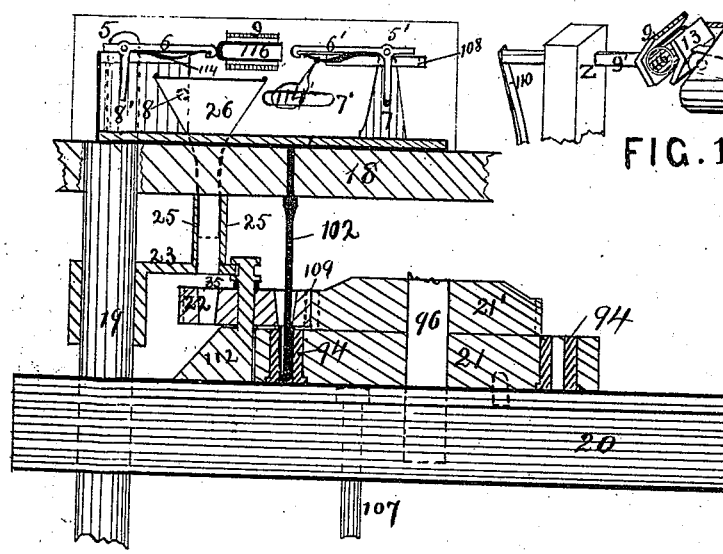

The upward motion of the carriage now moves the die-plate, carrying the shell in its hollow die, which has now been brought in line with the primer, so as to deposit the fulminate in the cavity to receive it in the shell. As shown in Fig. 7, the fulminate is contained in a reservoir, in which is revolved, by suitable means, on a stem, 51, yielding paddles or buckets 59, which force out through a side opening in the reservoir a portion of the fulminate into a receiver formed by a sleeve, 58, and its stem 61, held together by a stop or set-screw, 60, on the stem working in a slot in the sleeve. This stem 61 of the receiver is secured to a vibrating arm, 56, pivoted to the top 18 of the press. As the carriage moves up it moves the bent arm 50, which is attached to it, releasing a spring, 54, acting upon the head 53 of a stem coupled at its lower end 55 to the vibrating arm 56, turning it down, as shown in Fig. 15, where the rod 56 is shown in dotted lines, in line with the shell in the die-plate. The inner bottom of the shell 62, on the upward movement of the carriage, is pressed against the sleeve 58, in its motion moving it upward, and receiving the fulminate, which is forced therefrom by the stem 61 as the spring 57 is compressed. As the carriage moves down again the bent rod 50, through the head and stem 53, acts on the arm 56, swinging it back to the position shown in Fig. 7, for receiving another supply of fulminate. By the next partial revolution of the die-plate the shell is presented to a suitable priming-inspector, similar in general construction to the powder-inspector hereinafter to be described.

Figure 6:
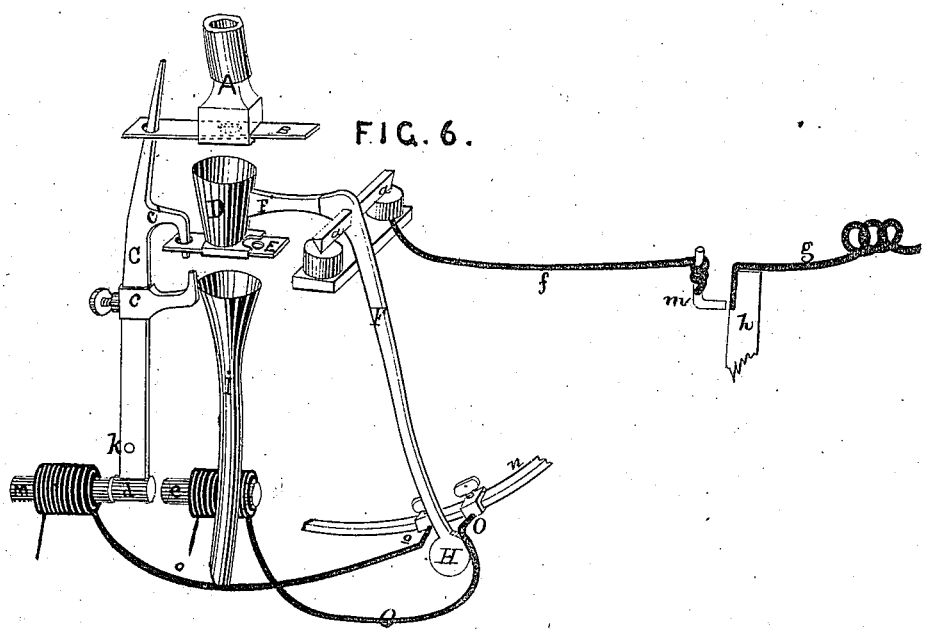

The primed shell is next presented in its die in the die-plate to a position to be charged with powder (see Fig. 6) from a tube, I, attached to and passing through the top 18 of the press, and provided with a funnel-mouth. Over this funnel-mouth is a valved scale-pan, D, provided with a valve, E, and attached to a bent scale-beam, F, counterpoised by its heavy end H. The scale-beam is balanced upon a pivot or knife-edge fulcrum, $a$. Immediately over the scale-pan D is a valve-box, A, connected, by a rubber or other weak tube, with a powder-reservoir constructed of weak material, so that in case of explosion no damage will occur.

A valve, B, is connected with a rocking lever, C, pivoted at $k$, and provided with hooks $c$ $c'$. On the end of the lever is a piece of soft iron, $d$, which is arranged between two electro-magnets, M and $e$, by which it may be vibrated, as is well understood, opening and closing the valves E and B.

A small wire, $f$, is connected with a metallic stud, $m$, which is connected with a battery at proper intervals to make the attachment operate the weighing devices by suitable means. This connection may be made by means of an arm, $h$, attached to and moving up and down with the press-carriage, so as to present the stud $m$ to a portion of the wire $g$, leading from the battery during a portion of the time that the shell in the die-plate is beneath the tube I. The opposite end of the wire $f$ is connected with the metallic portion of the scale-beam through its metallic fulcrum $a$. The portion F' of the scale-beam is of iron conducting material.

Wires O and $o$, each capable of adjustment at one end toward or from the other in boxes sliding on a guide, $n$, are attached at their opposite ends to the electro-magnets $e$ and M.

If the hook $c$ upon the rocking lever C and the adjustable slide of the wire O are both moved, the former down and the latter up, or to the right, and fixed by their set-screws, a greater quantity of powder is admitted to the tube I, and the reverse movement decreases the quantity. This change in the charge of powder is owing to the difference in the power required to move the scale-beam, which is, of course, diminished or increased in proportion to the distance the counterpoise H has to move. By the change of the position of the scale-pan D, produced by the weight of powder in it, it leaves the hook $c'$ as it descends, and passes onto the inclined hook $c$, at which moment the lower end of the scale-beam F comes in contact with the wire O, charging it with electricity, making a magnet of $e$, vibrating the arm C, thereby opening the valve E and closing B when the powder begins to run into the tube I from the scale-pan. As the scale-pan grows lighter by the discharge of its contents, the weight H begins to descend, raising the scale-pan, hooking its valve upon the hook $e'$; the scale-beam F comes in contact with the wire $o$, charging it with electricity, making a magnet of M, vibrating the lever C, and closing the valve E, the powder having been discharged from the scale-pan. At the same time the valve B is opened, and powder begins to flow into the scale-pan for another charge. The above operation is repeated at the proper moment to charge another shell.

The shell, after being charged, is presented by the next partial revolution of the die-plate to an inspector, (see Fig. 5,) constructed, in this case, so as to stop the machine in case the shell has not been properly charged. The inspector, in this instance, is shown as adapted to indicate shells which have received too great a charge of powder. I have, however, in practice made the inspector to indicate shells which have been charged with too small a quantity of powder, as well as those having too large a charge, by modifications of the mechanism shown in Fig. 5. In this figure a rod, 97, is caused to enter the shell in its die in the die-plate, by the upward motion of the press-carriage. This rod is secured so as to move endwise in a guide, 4, in the press-top 18. The downward movement of the rod is regulated by a head at or near its top. A lever, 1, pivoted at one end in a support, 3, is attached to the top plate 18, by a screw, 101. The opposite or free end of the lever enters an annular groove in the lower part of a fixed casing, 67, on a rod, 68, which is connected at its lower end to a piece, 86, carrying a catch, 71, in the cap 41 of the post 28, the catch engaging with a stop, 72, heretofore described, so that when the lever 1 is raised by a shell overcharged, it pushes up the rod 68 and with it the catch 71, releasing the stop 72, Figs. 3 and 5, which is thrown out by its spring, stopping the press, as hereinbefore described. By means of the casing 67 and its annular groove, the various inspectors, hereinbefore mentioned, may be operated and the press stopped by means of levers answering the same purpose as the one shown at 1, such changes in the construction of the parts being made as to adapt the inspectors to the various purposes to which they are applied—for instance, a rod similar to that shown at 97, made longer, is used for indicating when the shell-head is too thick.

Figure 13:
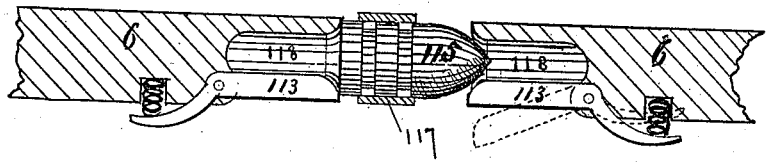
Fig. 13 shows the application of tilting fingers to the feeding of bullets or blanks, showing the fingers hollowed out at 118 118, to receive the tapering or conical end of a bullet or blank when presented in line with them in a carrier, 117, similar to 9, 13, Fig. 12.

By the next partial revolution of the die-plate carrying in its die the charged shell the shell is presented to the point to receive the bullet, which is fed to and inserted in the shell by mechanism substantially such as that employed for feeding and inserting the blank shells in the dies, heretofore described, the tilting fingers being constructed as heretofore described, and shown in Fig. 13.

By the next partial revolution of the die-plate and upward motion of the carriage the bullet is fastened in the shell by suitable well-known means; and, finally, by the next movement of the die-plate and carriage, the shell is ejected from the die-plate by a rod, 118, Fig. 4, through an opening in the carriage, shown in dotted lines in this figure.

In operation, the main gear 40 is continuously revolved by any suitable power. When the notch in the inner face of the gear-bearing comes in contact with the clutch 85, (see Fig. 3,) the gear and shaft are connected and revolve together, thus revolving the crank-shaft and producing an up-and-down motion to the carriage for every revolution of the shaft. The die plate has a partial revolution imparted to it in each down movement of the carriage, as before described, and is firmly locked to the carriage top during the latter part of its upward movement. The blanks or partially-completed shells are placed in the hopper P, from which they fall into the revolving drum. Being caught by its troughs, they are lifted in line with the feed-tube U, into which they are inserted by the push-rod, and conveyed to the assorting-fingers. The push-rod lever 44 is operated by the rib 91, attached to the carriage and moving up and down with it. When the carriage is down the lip 66 on the lever rests on top of the rib, as in Fig. 10, which shows an inside view of a portion of the lever 44. As the carriage ascends, the rib, acting on the lip, rocks the lever, withdrawing the push-rod from the drum. On the downward movement of the carriage, the lip which rocks the lever is removed and its spring 69 moves the push-rod, forcing a shell into the tube U, unless it is full, when the spring 69, which is attached to the bed-plate, yields, in which case the shells or blanks remain in the trough. At the time of the withdrawal of the reciprocating push-rod from the drum, a piece, 16, attached to the carriage, (see Figs. 1 and 8,) sliding vertically in a guide, 14, carries the spring-pawl X, engaging the toothed wheel R, fast on the supporting-shaft of the drum, and partially revolves it. At the same time a slot, 122, in the piece 16, (see Figs. 1 and 8,) operates a lever, 15, which reciprocates the sliding plate carrying the posts of the tilting fingers, thus imparting to them the motions before described.

The assorting-fingers place the blanks properly, one at a time, in the feed-tube, which conducts them to the die feed-plate, from whence they are pushed by the upward movement of the carriage, by a stationary punch, 102, secured to the press-top, into the dies in the die-plate. The die-plate, by its partial revolution, now presents the shell in its die to the first inspector for gaging its thickness, so that the press may be stopped unless the shell or blank meets the requirements of the gage. The next partial revolution of the die-plate presents the shell in its die to the action of the heading-punch. Very great power being required to perform the operation of heading or flowing a shell from a solid piece of metal, it is attained by the reduction of friction on the press as follows: In Figs. 4 and 5 the sector 79 acts, through its knife-edge 81', upon a hardened piece of steel inserted in the carriage. This sector is operated upon by the rolling-surface 74 of the segmental eccentric crank, driving the sector upward gradually, thus bringing the friction induced by the operation upon the crank shaft 30. To relieve the crank-shaft from the friction thus produced similar sectors 77 77', connected with each other, Figs. 4 and 5, are employed, rolling upon the raised surfaces of the hubs 76 76' of the crank-shaft. These sectors terminate at bottom in a knife-edge, resting in their oscillations upon a hardened steel plate, 36, supported by a wedge, 36', by which they may be adjusted on their sliding pivots 82 82', so as to transfer the strain from the shaft 30 to the knife-edges. The pivots 81 81' and 82 82' of all these sectors oscillate on axes in line with the knife edges in suitable guides to admit of adjustment. When, by the revolution of the crank-shaft, its eccentric and its raised portions have passed free of the sectors they are left in position to be respectively returned by their arms 32 and 78 to positions to resume the above operations, the arms 78 being struck by the foot of the carriage on its descent, and the arm 32 being struck by the hub 76 at the same time.

The segmental crank, at its back 121', where it engages the slot in the carriage, is concentric with the hub 76'. (See Fig. 5.) When the carriage is raised by the concentric portion of the segmental crank to the limit of the movement to which the concentric portion can elevate it, the eccentric portion of the segmental crank operates on the sector 79, as above described, elevating the carriage to an additional height. The shell being headed, (or flowed,) the continued revolution of the crank-shaft revolves the crank, which next works against the under side of the slot in the carriage and causes it to descend. The headed shell is next presented by a partial revolution of the die-plate to an inspector to indicate the condition of the shell or stop the machine; the next partial revolution of the die-plate presents the shell in the die to the action of the primer to receive the fulminate, and from thence, by another partial revolution, to an inspector; another partial revolution of the die-plate presents the primed shell to the position to receive its charge of powder, from whence it passes, by the movement of the die-plate, to the charge-inspector, after which the die-plate presents the charged shell to the point to receive the bullet; the bullet is next secured in the shell, and the finished cartridge finally ejected.

I claim as my invention—

1. The combination of the driving-gear, the crank-shaft, the spring-pawl, the notch in the bearing-surface of the gear, and the compressing-pin for disconnecting the clutch and gear, as set forth.

2. The combination of the crank-shaft the segmental eccentric crank, the carriage, and the sector secured to the carriage, and acted upon by the eccentric portion of the crank, substantially as set forth.

3. The combination of the crank-shaft, the driving-gear, its clutch mechanism, the segmental eccentric crank, the hubs on the crank-shaft, the sliding carriage, the sector thereon, and the sectors secured to the bed-plate, these members being constructed and operating substantially as set forth.

4. The combination of a fixed punch, a moving die-plate, and a resisting-die, locked with the die-plate during the operation of the punch, substantially as set forth.

5. The combination of the hopper, the open-ended feed-drum, the troughs in the feed-drum, the reciprocating push-rod, and the conveying-tube, these members being constructed and operating substantially as set forth.

6. The combination of the conveying-tube, the carrier, the tilting fingers, the tube, and the feed-plate, these members being constructed and operating substantially as set forth.

7. The assorting tilting fingers, constructed and operating substantially as set forth.

8. The combination of the fulminate-reservoir, having an opening in its side, the yielding paddles revolving in the reservoir, and the fulminate-receiver, these members being constructed and operating substantially as set forth.

9. The combination of the fulminate-receiver, its sliding sleeve, the vibrating arm, carrying the receiver, and the die-plate, carrying the shell to be primed, these members being constructed and operating substantially as set forth.

10. The combination, in a machine for loading cartridges, of the valved powder-conveying tube, the conveying-tube I, the valved scale-pan, arranged between the tubes, its scale-beam, and the hooked rocking lever, these members being constructed and operating substantially as set forth.

11. The combination, in machines for loading cartridges, of the valved conveying-tube, the valved scale-pan, the rocking lever, connected with the valves of the conveying-tube and scale-pan, the electrically-charged scale-beam, the electro-magnets, and connecting-wires, these members being constructed and operating substantially as set forth.

12. The combination of the main gear, its clutch, the disconnecting-pin, a catch engaging therewith, a lever, and an inspector connected thereby with the catch-rod, these members being constructed and operating substantially as set forth.

In testimony whereof I have hereunto subscribed my name.

JOE V. MEIGS.

Witnesses:
 JOSEPH I. PEYTON,
 B. H. MORSE.